United States Patent

Strothmann

(10) Patent No.: US 9,212,894 B2
(45) Date of Patent: Dec. 15, 2015

(54) APPARATUS FOR DETERMINING THE POSITION OF THE ROTOR OF AN ELECTRICAL MACHINE

(76) Inventor: Rolf Strothmann, Saarbrücken (DE)

( * ) Notice: Subject to any disclaimer, the term of this patent is extended or adjusted under 35 U.S.C. 154(b) by 274 days.

(21) Appl. No.: 13/978,599

(22) PCT Filed: Jan. 6, 2012

(86) PCT No.: PCT/DE2012/100003
§ 371 (c)(1),
(2), (4) Date: Jul. 8, 2013

(87) PCT Pub. No.: WO2012/092925
PCT Pub. Date: Jul. 12, 2012

(65) Prior Publication Data
US 2013/0328551 A1 Dec. 12, 2013

(30) Foreign Application Priority Data
Jan. 8, 2011 (DE) .......................... 10 2011 008 141

(51) Int. Cl.
*G01B 7/14* (2006.01)
*H02P 6/18* (2006.01)
*H02P 27/08* (2006.01)

(52) U.S. Cl.
CPC *G01B 7/14* (2013.01); *H02P 6/182* (2013.01); *H02P 27/08* (2013.01)

(58) Field of Classification Search
CPC .................................. G01B 7/14; H02P 6/182
USPC ..................................................... 324/207.13
See application file for complete search history.

(56) References Cited

U.S. PATENT DOCUMENTS

| 4,495,450 | A * | 1/1985 | Tokizaki et al. | ............ 318/400.1 |
| 5,233,280 | A * | 8/1993 | Ghosh | ............ 318/800 |
| 6,366,037 | B1 * | 4/2002 | Strothmann | ............ 318/400.36 |
| 6,633,145 | B2 * | 10/2003 | Shao et al. | ............ 318/400.35 |
| 2003/0098666 | A1 * | 5/2003 | Shao et al. | ............ 318/727 |

FOREIGN PATENT DOCUMENTS

| DE | 102006046637 | 6/2007 |
| EP | 1005716 | 11/2001 |

\* cited by examiner

*Primary Examiner* — Arleen M Vazquez
*Assistant Examiner* — Brent J Andrews
(74) *Attorney, Agent, or Firm* — Lucas & Mercanti, LLP; Klaus P. Stoffel

(57) ABSTRACT

An apparatus for determining the position of the rotor of an electric machine in relation to the stator, wherein the electric machine has at least three winding phases, which each have at least one pole winding with a magnetizable core, with devices for detecting a measurement signal. The instantaneous degrees of magnetization of the pole winding cores influenced by the magnetic field of the rotor, depend on the position of the rotor. The devices for detecting the measurement signal for tapping off the measurement signal are provided exclusively outside the electric machine at connecting conductors used for energizing the electric machine. Preferably, switching devices for temporarily isolating at least one of the connecting conductors from an operating voltage source are provided, wherein the measurement signal can be tapped off at the connecting conductor which has been isolated from the operating voltage source.

8 Claims, 3 Drawing Sheets

APPARATUS FOR DETERMINING THE POSITION OF THE ROTOR OF AN ELECTRICAL MACHINE

The present application is a 371 of International application PCT/DE2012/100003, filed Jan. 6, 2012, which claims priority of DE 10 2011 008 141.0, filed Jan. 8, 2011, the priority of these applications is hereby claimed and these applications are incorporated herein by reference.

BACKGROUND OF THE INVENTION

The invention relates to an apparatus for determining the position of the rotor of an electrical machine in relation to the stator, wherein the electrical machine comprises at least three phase strands which each comprise at least one pole winding with a magnetizable core; with devices for determining a measurement signal which is characterized by the current degrees of magnetization of the pole winding cores which are dependent on the position of the rotor.

Apparatus for determining the position of the rotor of an electrical machine are known from EP 1 005 716 B and DE 10 2006 046 637 A1. Within each half magnetic period, a clear functional relationship exists between the measurement signal and the rotor position which can be utilized for the determination of the position. In these known apparatus, the measurement signal is picked up, inter alia, at the star point of phase strands switched in a star configuration.

SUMMARY OF THE INVENTION

The invention is based on the object of creating a novel apparatus of the above mentioned type which does not require any provisions at the electric machine itself or/and any manipulations of this electrical machine.

The apparatus according to the invention which meets this object is characterized in that the apparatus for picking up the measurement signal for determining the measurement signal are provided exclusively outside of the electrical machine at the connecting conductors serving for supplying current to the electrical machine.

In accordance with an advantageous feature, the apparatus according to the invention for determining the current rotor position can be completely integrated independently of the electrical machine in a current supply device serving for the operation of the motor of the electrical machine.

The phase strands of the electrical machine can be switched in a star or/and triangular configuration.

In accordance with a particularly preferred embodiment of the invention, switching devices are provided for the temporary separation of at least one of the connecting conductors of one operating voltage source, and the measurement signal can be picked up essentially independently of harmful influences at the respective connecting conductor which is separate from the operating voltage source.

In particular, switching devices for the successive separation of the connecting conductors from the operating voltage source can be provided within a short period of time within which changes of the rotor position are negligible, and, as a result, several measurement signals can be picked up at the connective conductors which are separated from the operating voltage. Accordingly, as a result, the rotor position can be determined more precisely.

In accordance with another further development of the invention, devices are provided for making available a separate measurement voltage which produces the measurement signal or/and the measurement signal results from an operating voltage which is applied to the electrical machine during motor operation.

The separate measurement voltage is preferably a measurement voltage pulse, and the operating voltages are voltage pulses applied within the scope of a pulse width modulation.

Preferably, a direct voltage ($U_B$) corresponding with the current inductivities of an operating voltage source divided into at least two of the phase strands, serves as a measurement signal.

BRIEF DESCRIPTION OF THE DRAWING

In the following, the invention will be described in more detail with the aid of embodiments and the enclosed drawings referring to these embodiments. In the drawings.

DETAILED DESCRIPTION OF THE INVENTION

Figure 1:
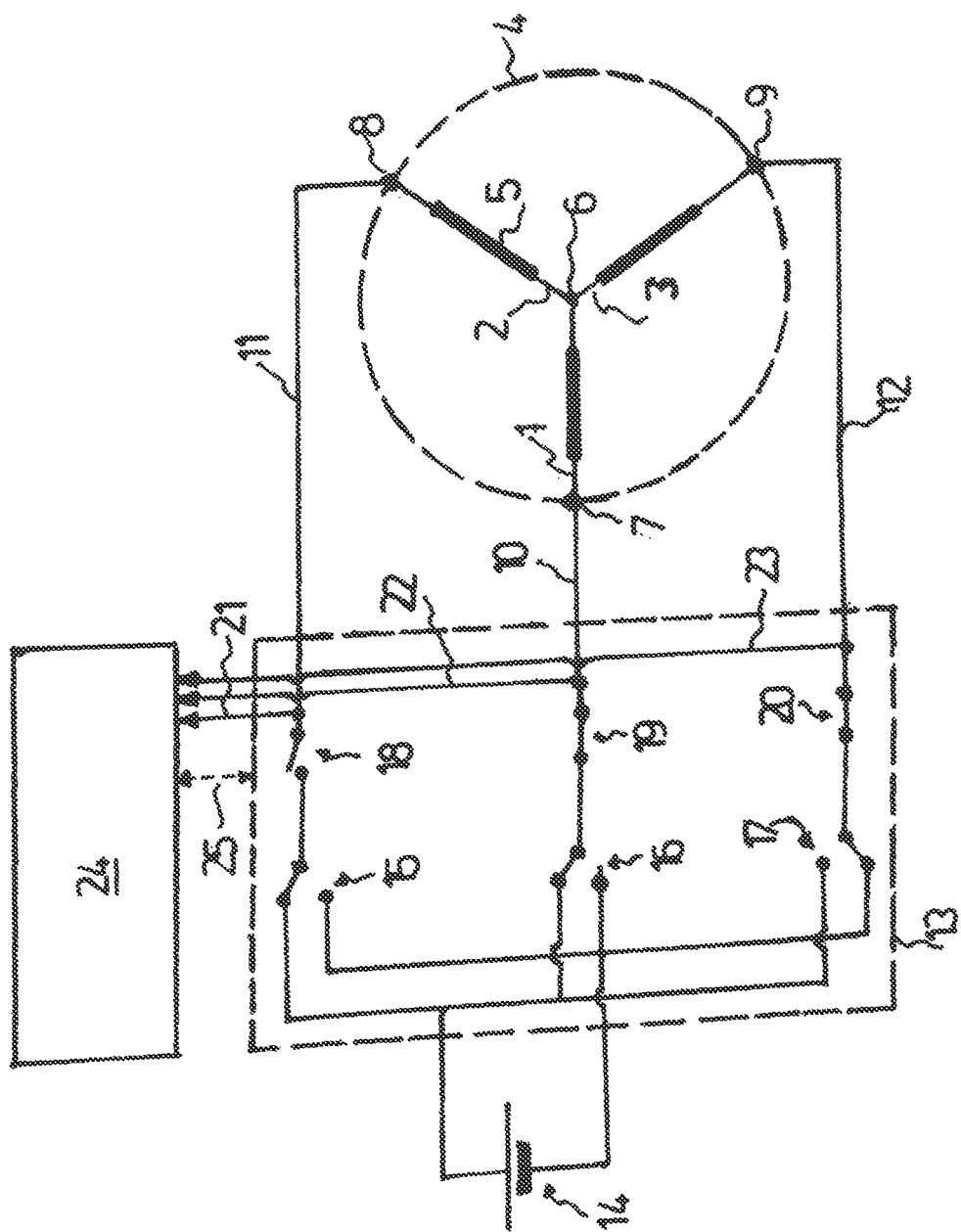
FIG. 1 shows an apparatus according to the invention in a schematic illustration.

An electrical machine 4 schematically illustrated in FIG. 1 comprises three phase strands 1, 2 3. Depending on the number of magnetic periods of the electrical machine 1, each has several pole windings 5 switched in series, each having an iron core.

The three phase strands 1, 2, 3 are switched together at a star point 6. The other ends of the phase strands 1, 2, 3 extend outwardly to the connections 7, 8, 9 for lines 10, 11, 12 which serve for supplying current to the electrical machine 1.

The lines 10, 11, 12 can be connected through a current supply circuit 13 to a battery 14. The current supply device 13 comprises switching devices 15, 16, 17 through which selectively the plus or minus pole of the battery 14 can be placed at the respective phase strands 1, 2, 3 through the lines 10, 11, 12. The current supply circuit 13 further includes circuit breaker circuits 18, 19, 20 which selectively can separate one of the phase strands 1, 2, 3 completely from the battery 14.

In the illustrated embodiment, signal lines 21, 22, 23 for picking up a voltage signal, branch off from the lines 10, 11, 12 within a structural unit for forming the current supply circuit 13. The signal lines 21, 22, 23 conduct the voltage signals to a measurement circuit 24. The measurement circuit 24 is connected to the current supply circuit 13 through a control line 25.

Figure 2:
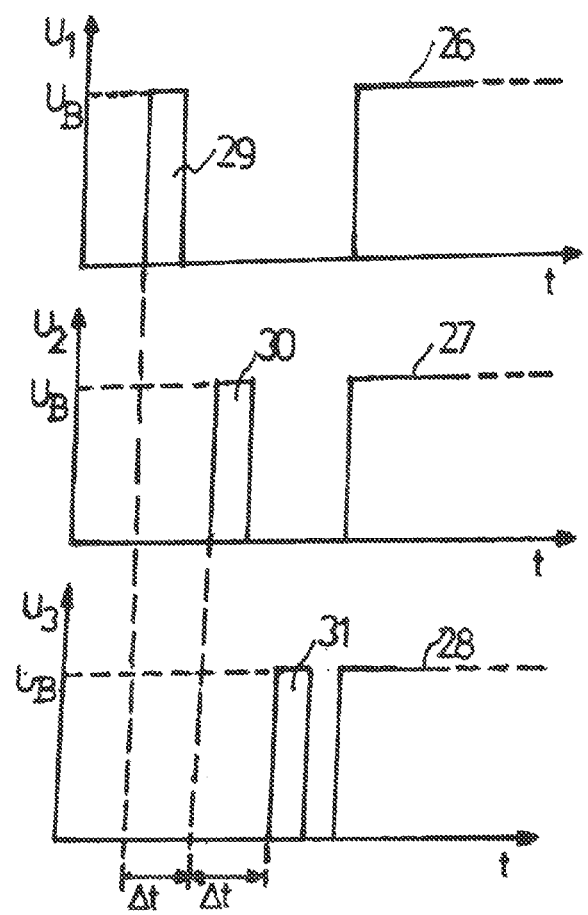
FIGS. 2 and 3 show an illustration each explaining the measurement principle of the apparatus of FIG. 1.

In accordance with FIG. 2, during motor operation of the electrical machine 4, current supply pulses 26, 27, 28 of the battery voltage $U_B$ are cyclically applied to the phase strands 1, 2, 3 in accordance with the pulse width modulation method (PWM-Method) by the current supply circuit 13. Controlled by the measuring circuit 24, the current supply circuit 13 additionally produces in each n-th PWM-cycle (n=1, 2, 3 . . . ), additional measuring pulses 29, 30, 31 which are applied relative to each other offset with respect to time by $\Delta_t$ to always two of the three phase strands 1, 2, 3, so that the battery voltage $U_B$ drops over the two phase strands. During this time, the respectively third phase strand is separated by the respective circuit breaking circuit 18, 19 or 20 from the battery 14. The measuring circuit 24 determines, through the lines 21, 22, 23 respectively, the potential at the deactivated end of the respective phase strand defined by the measurement pulses 29, 30, 31.

When the battery voltage $U_B$ drops at two of the phase strands 1, 2, 3 respectively, the battery voltage $U_B$ is divided by the corresponding phase strands, wherein the divided voltage $U_{s1}, U_{s2}, U_{s3}$ is applied to the deactivated end of the respectively third phase strand. Accordingly, the measuring pulses 29, 30, 31 produce at the deactivated ends pulses of the magnitude $U_{s1}, U_{s2}, U_{s3}$ in accordance with the voltage supply ratio.

The degrees of magnetization of the iron cores of the pole windings are determinative for the voltage dividing ratio, whose proportion caused by the exciter field of the electrical machine is within each half magnetic period an unequivocal function of the position of the rotor in relation to the stator of the electrical machine. Therefore, as described in DE 10 2006 046 637 A1 of the applicant incorporated herein by reference, the position of the rotor can be determined from the continuously measured pulses of the level $U_{s1}, U_{s2}, U_{s3}$.

Figure 3:
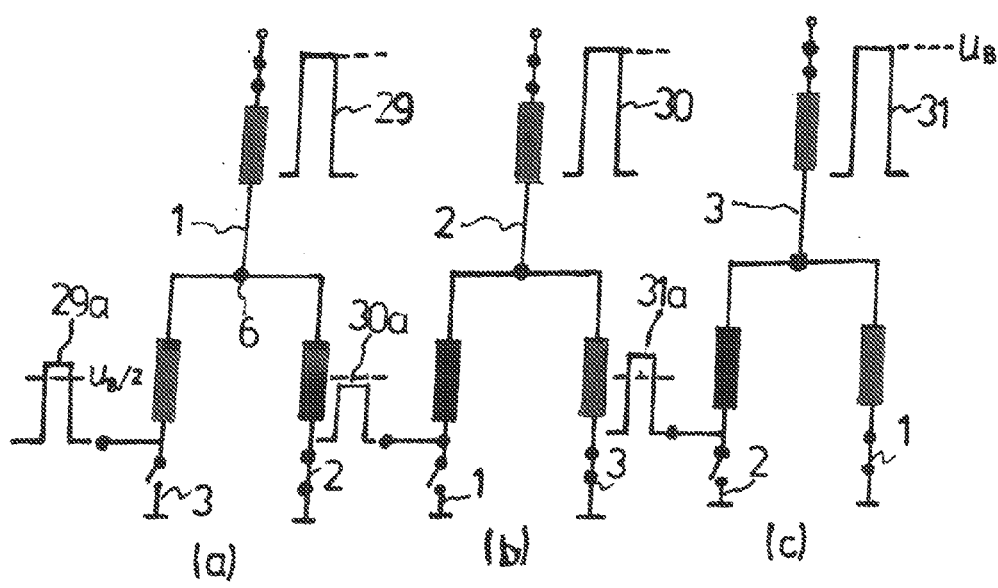

As can be seen in FIG. 3, the pulses picked up at the deactivated end produced by the measuring pulses 29, 30, 31 vary in their level by the voltage value $U_B/2$. Superimposed on these pulses is the voltage (EMK) induced in the deactivated phase strand which, however, does practically not change within a PWM-Cycle and, thus, can be eliminated as a constant value by forming the differences $U_{s1}-U_{s2}$, $U_{s2}-U_{s3}$, and $U_{s1}-U_{s3}$ between the picked up voltages. The position of the rotor can be determined from the difference signals, as is described in the above mentioned DE 10 2006 046 637 A1.

Instead of the separate measuring pulses 29, 30, 31 it would also be possible to utilize the flanks of the current supply pulses 26, 27, 28 themselves which drop at different times. These flanks lead to a step at the respectively deactivated phase strands, wherein the height of the step may serve as the measurement signal.

Figure 4:
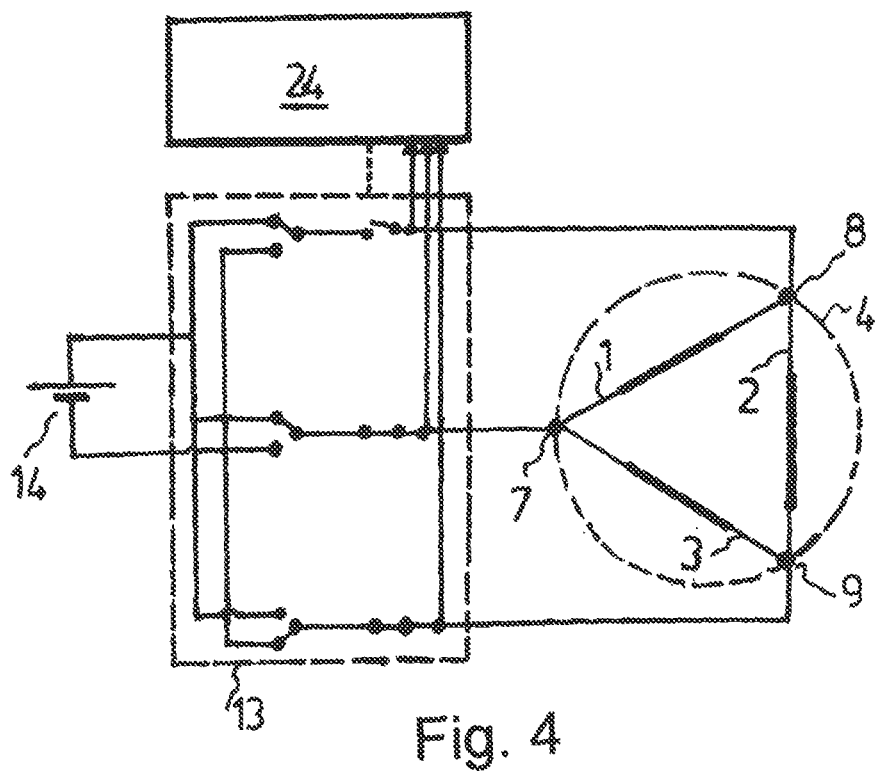
FIG. 4 shows another embodiment of an apparatus according to the invention.

An apparatus illustrated in FIG. 4 differs from the apparatus of FIG. 1 in that the phase strands 1, 2, 3 are not switched in a star configuration but in a triangular configuration. As in the embodiment in FIG. 1, it is possible also in this embodiment to optionally separate each of the three current supply connections 7, 8, 9 of the electrical machine 4 from the battery 14.

Figure 5:
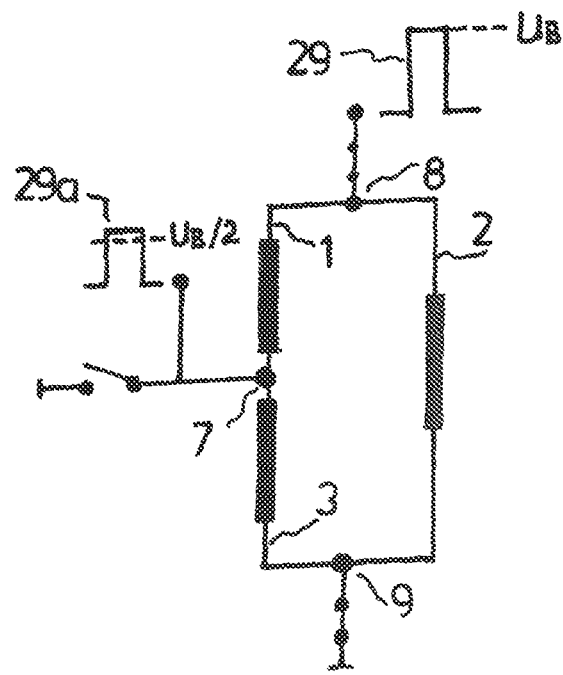
FIG. 5 shows an illustration explaining the measuring principle of the apparatus of FIG. 4.

For example, in accordance with FIG. 5, a measuring pulse 29 is applied to the connections 8, 9 by connecting the plus pole of the battery 14 to the connection 8 and the minus pole to the connection 9. This measuring pulse 29 produces at the deactivated connection 7 a voltage pulse whose level is determined by the current voltage distributing ratio between the phase strands 1 and 3.

In the embodiment of FIG. 4, instead of separate measuring pulses for determining the position of the rotor, it would be possible to utilize current supply pulses themselves which lead to step-like leaps of the potential at the respective deactivated current connection, wherein the step height has to be determined as the signal usable for the position determination.

The invention claimed is:

1. An apparatus for determining a position of a rotor of an electrical machine in relation to a stator, comprising: at least three phase strands arranged in the electrical machine which each include at least one pole winding with a magnetizable core; a current supply circuit that includes switching devices by which a positive or a negative pole of an operating voltage source is selectively applicable to the phase strands via connecting conductors, and further switching devices by which at least one of the phase strands is selectively isolatable from the operating voltage source; and devices for determining a measurement signal which is determined by current degrees of magnetization of the pole winding cores which depend on the position of the rotor, wherein the measurement signal is a DC voltage of the operating source, which DC voltage is divided in accordance with momentary inductivities of at least two of the phase strands, wherein the devices for determining the measurement signals are provided to pick up the measurement signals exclusively outside of the electrical machine at the connecting conductors serving for supplying current to the electrical machine, wherein the further switching devices are provided for temporarily separating at least one of the connecting conductors from the operating voltage source, and the measurement signal can be picked up at the connecting conductor separated from the operating voltage source.

2. The apparatus according to claim 1, wherein the phase strands are switched in a star configuration.

3. The apparatus according to claim 1, wherein the phase strands are switched in a triangular configuration.

4. The apparatus according to claim 1, wherein switching devices are provided for successive separation of the connecting conductors from the operating voltage source within a short period of time within which a position change of the rotor is negligible, and the measuring signal can be picked up at the connecting conductor which has been separated from the operating voltage source.

5. The apparatus according to claim 1, further comprising devices for making available a separate measurement voltage producing the measurement signal.

6. The apparatus according to claim 1, wherein the measurement signal results from an operating voltage applied during motor operation of the electrical machine.

7. The apparatus according to claim 5, wherein the separate measuring voltage is a measuring voltage pulse.

8. The apparatus according to claim 6, wherein
the operating voltages are current supply pulses applied within the scope of a pulse width modulation.

* * * * *